United States Patent
Giannakis et al.

(10) Patent No.: US 7,139,321 B2
(45) Date of Patent: Nov. 21, 2006

(54) CHANNEL ESTIMATION FOR WIRELESS OFDM SYSTEMS

(75) Inventors: Georgios B. Giannakis, Minneapolis, MN (US); Shengli Zhou, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 812 days.

(21) Appl. No.: 10/094,946

(22) Filed: Mar. 7, 2002

(65) Prior Publication Data

US 2002/0181389 A1 Dec. 5, 2002

Related U.S. Application Data

(60) Provisional application No. 60/274,367, filed on Mar. 8, 2001.

(51) Int. Cl.
*H04K 1/10* (2006.01)
(52) U.S. Cl. ...................................................... 375/260
(58) Field of Classification Search ................. 375/260
See application file for complete search history.

(56) References Cited

U.S. PATENT DOCUMENTS

| | | | |
|---|---|---|---|
| 6,088,408 A | 7/2000 | Calderbank et al. | |
| 6,441,786 B1 * | 8/2002 | Jasper et al. | 342/383 |
| 6,449,245 B1 * | 9/2002 | Ikeda et al. | 370/280 |
| 6,487,253 B1 * | 11/2002 | Jones et al. | 375/260 |
| 6,707,856 B1 * | 3/2004 | Gardner et al. | 375/260 |
| 6,850,481 B1 * | 2/2005 | Wu et al. | 370/208 |
| 2002/0122502 A1 | 9/2002 | El-Gamal et al. | |
| 2002/0136327 A1 | 9/2002 | El-Gamal et al. | |

OTHER PUBLICATIONS

Bingham, "Multicarrier Modulation for Data Transmission: An Idea Whose Time Has Come," IEEE Communications Magazine, pp. 5-14, May 1990.
Caire et al., "Bit-Interleaved Coded Modulation," IEEE Transactions on Information Theory, vol. 44, No. 3, pp. 927-946, May 1998.
Courville et al., "Blind Equalization of OFDM System based on the Minimization of a Quadratic Criterion," Proc. of ICC, Dallas, USA, vol. 3, pp. 1318-1321, Jun. 1996.
Frenger et al., "Decision-Directed Coherent Detection in Multicarrier Systems on Rayleigh Fading Channels," IEEE Trans. On Vehicular Tech., vol. 48, No. 2, pp. 490-498, Mar. 1999.
Heath, Jr. et al., "Exploiting Input Cyclostationarity for Blind Channel Identification in OFDM Systems," IEEE Transactions on Signal Processing, vol. 47, No. 3, pp. 848-856, Mar. 1999.

(Continued)

*Primary Examiner*—Kevin Kim
(74) *Attorney, Agent, or Firm*—Shumaker & Sieffert, PA

(57) ABSTRACT

Techniques are described for efficiently estimating and compensating for the effects of a communication channel in a multi-carrier wireless communication system. The techniques exploit the fact that the transmitted symbols are drawn from a finite-alphabet to efficiently estimate the propagation channel for multi-carrier communication systems, such systems using OFDM modulation. A transmitter transmits data through a communication channel according to the modulation format. A receiver includes a demodulator to demodulate the data and an estimator to estimate the channel based on the demodulated data. The channel estimator applies a power-law operation to the demodulated data to identify the channel. The techniques can be used in both blind and semi-blind modes of channel estimation.

30 Claims, 7 Drawing Sheets

OTHER PUBLICATIONS

Mignone et al., "CD3-OFDM: A Novel Demodulation Scheme for Fixed and Mobile Recievers," IEEE Transactions on Communications, vol. 44, No. 9, pp. 1144-1151, Sep. 1996.

Muquet et al., "A Subspace Based Blind and Semi-Blind Channel Identification Method for OFDM Systems," Proc. of IEEE-SP Workshop on Signal Proc. Advances in Wireless Comm., Annapolis, MD, pp. 170-173, May 9-12, 1999.

Muquet et al., "OFDM with Trailing Zeros Versus OFDM with Cyclic Prefix: Links, Comparisons and Application to the Hiperlan/2 Systems," Proc. of Intl. Conf. On Com., New Orleans, pp. 1049-1053, June 2000.

Muquet et al., "Reduced Complexity Equalizers for Zero-Padded OFDM Transmissions," Proc. of Intl. Conf. On Acoust. Speech and Signal Proc., vol. 5, pp. 2973-2976, Instanbul, Turkey, Jun. 5-9, 2000.

Ruiz et al., "Discrete Multiple Tone Modulation with Coset Coding for the Spectrally Shaped Channel," IEEE Transactions on Communications, vol. 4, No. 6, pp. 1012-1029, Jun. 1992.

Scaglione et al., "Redundant Filterbank Precoders and Qualizers Part II: Blind Channel Estimation, Synchronization, and Direct Equalization," IEEE Transactions on Signal Processing, vol. 47, No. 7, pp. 2007-2022, Jul. 1999.

Tufvesson et al., "Pilot Assisted Channel Estimation for OFDM in Mobile Cellular Systems," Proc. of the Vehicular Technology Conf., Phoenix, USA, vol. 3, pp. 1639-1643, May 1997.

van de Beek et al., "On Channel Estimation in OFDM Systems," Proc. of the Vehicular Technology Conf., Chicago, USA, vol. 2, pp. 815-819, Jul. 1995.

van Nee et al., "New High-Rate Wireless LAN Standards," IEEE Communications Magazine, vol. 37, No. 12, pp. 82-88, Dec. 1999.

Wang et al., "Wireless Multicarrier Communications: Where Fourier Meets Shannon," IEEE Signal Processing Magazine, pp. 29-48, May 2000.

Zhou et al., "Long Codes for Generalized FH-OFDMA Through Unknown Multipath Channels," IEEE Transactions on Communications, vol. 49, No. 4, pp. 721-733, Feb. 2001.

Zhou et al., "Fequency-Hopped Generalized MC-CDMA for Multipath and Interference Suppression," Proc. of MILCOM Conf., Los Angeles, CA, pp. 937-941, Oct. 22-25, 2000.

Giannakis, "Filterbanks for Blind Channel Identification and Equalization," IEEE Signal Processing Letters, vol. 4, No. 6, pp. 184-187, Jun. 1997.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 267-270, Mar. 20-23, 2001.

Srihari Adireddy et al., "Optimal Embedding of Known Symbols for OFDM," in Procedures International Conference, ASSP, vol. 4, Salt Lake City, UT, May 2001.

Yan Xin et al., "Space-Time Diversity Systems Based on Linear Constellation Precoding," IEEE Transactions On Wireless Communications, vol. 2, No. 2, pp. 294-309, Mar. 2003.

Yan Xin et al., "Space-Time Diversity Systems Based on Unitary Constellation-Rotating Precoders," in Procedures International Conference, Speech, Signal Process., Salt Lake City, UT, pp. 2429-2432, May 7-11, 2001.

Alexandra Duel-Hallen et al., "Long-Range Predication of Fading Channels," IEEE Signal Processing Magazine, pp. 62-75, May 2000.

Anastasios Stanoulis et al., "Block FIR Decision-Feedback Equalizers for Filterbank Precoded Transmissions with Blind Channel Estimation Capabilities," IEEE Transactions on Communications, vol. 49, No. 1, pp. 69-83, Jan. 2001.

Anders Furuskar et al., "EDGE: Enhanced Data Rates for GSM and TDMA/136 Evolution," IEEE Personal Communications, vol. 6, No. 3, pp. 56-66, Jun. 1999.

Amos Lapidoth et al., "Fading Channels: How Perfect Need "Perfect Side Information" be?," in Procedures IEEE Information Theory Communications Workshop, pp. 36-38; Jun. 1999.

Ayman F. Naguib et al., "Increasing Data Rate Over Wireless Channels," IEEE Signal Processing Magazine, vol. 17, pp. 76-92, May 2000.

Akbar M. Sayeed et al., "Joint Multipath-Doppler Diversity in Mobile Wireless Communications," IEEE Transactions On Communications, vol. 47, No. 1, pp. 123-132, Jan. 1999.

A.P. Clark et al., "Adaptive Channel Estimator for an HF Radio Link," IEEE Transactions On Communications, vol. 37, No. 9, pp. 918-926, Sep. 1989.

Anna Scaglione et al., "Filterbank Transceivers Optimizing Information Rate in block Transmissions Over Dispersive Channels, " IEEE Transactions on Information Theory, vol. 45, No. 3, pp. 1019-1032, Apr. 1999.

Anna Scaglione et al., "Redundant Filterbank Precoders and Equalizers Part I: Unification and Optimal Designs," IEEE Transactions on Signal Processing, vol. 47, No. 7, pp. 1988-2022, Jul. 1999.

B. Muquet et al., "Reduced Complexity Equalizers For Zero-Padded OFDM Transmissions," Procedures of International Conference on ASSP, vol. 5, pp. 2973-2976, Jun. 2000.

Babak Hassibi et al., "How Much Training Is Needed in Multiple-Antenna Wireless Links?" IEEE Transactions On Information Theory, vol. 49, No. 4, pp. 951-963, Apr. 2003.

Ben Lu et al, "Space-Time Code Design in OFDM Systems,"in Procedures Global Telecommunications Conference, vol. 2, San Francisco, CA, pp. 1000-1004, Nov. 27-Dec. 1, 2000.

Cristian Budianu et al., "Channel Estimation for Space-Time Orthogonal Block Codes," IEEE Transactions on Signal Processing, vol. 50, No. 10, pp. 2515-2528, Oct. 2002.

C. Fragouli et al., "Finite-Alphabet Constant-Amplituted Training Sequence for Multiple-Antenna Broadband Transmissions," Procedures of IEEE International Conference on Communications, vol. 1, pp. 6-10, NY City, Apr. 28-May 1, 2002.

C. Fragouli et al., "Reduced-Complexity Training Schemes for Multiple-Antenna Broadband Transmissions," Procedure of Wireless Communications and Networking Conference, vol. 1, pp. 78-83, Mar. 17-21, 2002.

Cihan Tepedelenlioglu et al., "Transmitter Redundancy for Blind Estimation and Equalization of Time-and Frequency-Selective Channels," IEEE Transactions On Signal Processing, vol. 48, No. 7, pp. 2029-2043, Jul. 2000.

Dakshi Agrawal et al., "Space-Time Coded OFDM High Data-Rate Wireless Communication Over Wideband Channels," in Procedures on Vehicle Technology Conference, Ottawa, ON, Canada, pp. 2232-2236, May 18-21, 1998.

Deva K. Borah et al., "Frequency-Selective Fading Channel Estimation with a Polynomial Time-Varying Channel Model," IEEE Transactions On Communications, vol. 47, No. 6, pp. 862-873, Jun. 1999.

Dennis L. Goeckel, "Coded Modulation With Non-Standard Signal Sets for Wireless OFDM Systems," in Procedures International Conference Communications, Vancouver, BC, Canada, pp. 791-795, Jun. 1999.

Ezio Biglieri et al., "Fading Channels: Information-Theoretic and Communications Aspects," IEEE Transactions on Information Theory, vol. 44, No. 6, pp. 2619-2692, Oct. 1998.

Emanuele Viterbo et al. ,"A Universal Lattice Code Decoder for Fading Channels," IEEE Transactions on Information Theory, vol. 45, No. 5, pp. 1639-1642, Jul. 1999.

E. Lindskog et al, "A Transmit Diversity Scheme for Channels With Intersymbol Interference," Procedures of ICC, vol. 1, pp. 301-311, Jun. 2000.

Fredrick W. Vook et al., "Transmit Diversity Schemes for Broadband Mobile Communication Systems," Procedures fo IEEE VTC, vol. 6, pp. 2523-2529, 2000.

Fredrik Tufvesson et al., "OFDM Time and Frequency Synchronization by Spread Spectrum Pilot Technique," in Procedures 8th Communication Theory Mini-Conference, Vancouver, BC, Canada, pp. 1-5, Jun. 1999.

Georgios B. Giannakis, "Cyclostationary Signal Analysis," The Digital Signal Processing Handbook, V.K. Madisetti and D. Williams, Eds. Boca Raton, FL: CRC, Chapter 17, 1998.

Georgios B. Giannakis et al., "Basis Expansion Models and Diversity Techniques for Blind Identification and Equalization of Time-Varying Channels," Proceedings of the IEEE, vol. 86, No. 10, pp. 1969-1986, Oct. 1998.

Gerard J. Foschini, "Layered Space-Time Architecture for Wireless Communications in a Fading Environment When Using Multi-Element Antennas," Bell Labs Technical Journal, vol. 1, No. 2, pp. 41-59, 1996.

Ghassan Kawas Kaleh, "Channel Equalization for Block Transmission Systems," IEEE Journal on Selected Areas in Communications, vol. 13, No. 1, pp. 110-121, Jan. 1995.

H. Vincent Poor, "Probability of Error in MMSE Multiuser Detection," IEEE Transaction on Information Theory, Vol. 43, No. 3, pp. 858-871, May 1997.

Helmut Bolcskei et al., Blind Channel Identification and Equalization in OFDM-Based Multiantenna Systems, IEEE Transactions on Signal Processing, vol. 50, No. 1, pp. 96-109, Jan. 2002.

Helmut Bolcskei et al. ,"Space-Frequency Coded Broadband OFDM Systems," Invited paper, presented at IEEE WCNC 2000, Chicago, pp. 1-6, Sep. 2000.

Helmut Bolcskei et al., "Space-Frequency Codes for Broadband Fading Channels," in International Symposium Information Theory, Washington, DC, 1 page, June 2001.

Hui Liu et al, "High-Effiency Carrier Estimator For OFDM Communications," IEEE Communications Letters, vol. 2, No. 4, pp. 104-106, Apr. 1998.

Hikmet Sari et al., "Transmission Techniques for Digital Terrestrial TV Broadcasting," IEEE Communications Magazine, vol. 33, pp. 100-103, Feb. 1995.

H. Vikalo et al., "Optimal Training for Frequency-Selective Fading Channels," Procedures of International Conference on ASSP, Salt Lake City, Utah, vol. 4, pp. 2105-2108, May 7-11, 2001.

I. Barhumi et al., "Optimal Training Sequences for Channel Estimation in MIMO OFDM Systems in Mobile Wireless Communications," Procedures of International Zurich Seminar on Access, Transmission, Networking of Broadband Communications, 6 pgs., ETH Zurich, Switzerland, Feb. 19-21, 2002.

I.Emre Telatar, "Capacity of Multiple-Antenna Gaussian Channels," European Transactions Telecommunications, vol. 10, pp. 1-28, Nov.-Dec. 1998.

Jens Baltersee et al., "Achievable Rate of MIMO Channels With Data-Aided Channel Estimation and Perfect interleaving," IEEE Journal on Selected Areas In Communication, vol. 19, No. 12, 2358-2368, Dec. 2001.

J. Boutros et al., "Signal Space Diversity: A Power And Bandwidth Efficient Diversity Technique for the Rayleigh Fading Channel," IEEE Transactions Information Theory, vol. 44, pp. 1-34, Jul. 1998.

Jerome A. Gansman et al., "Optimum and Suboptimum Frame Synchronization for Pilot-Symbol-Assisted Modulation," IEEE Transactions on Communciations, vol. 45, No. 10, pp. 1327-1337, Oct. 1997.

Jiann-Cing Guey et al., "Signal Design for Transmitter Diversity Wireless Communication Systems Over Rayleigh Fading Channels," IEEE Transactions on Communications, vol. 47, No. 4, pp. 527-537, Apr. 1999.

Jonathan H, Manton et al., "Affine Precoders for Reliable Communications," in Procedures International Conference ASSP, vol. 5, Istanbul, Turkey, pp. 2749-2752, Jun. 2000.

James K. Cavers, "Pilot Symbol Assisted Modulation and Differential Detection in Fading and Delay Spread," IEEE Transactions On Communications, vol. 43, No. 7, pp. 2206-2212, Jul. 1995.

James K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

Jitendra K. Tugnait et al., "Second-Order Statistics-Based Blind Equalization of IIR Single-Input Multiple-Output Channels with Common Zeros," IEEE Transactions On Signal Processing, vol. 47, No. 1, pp. 147-157, Jan. 1999.

Linda M. Davis et al., "Joint MAP Equalization and Channel Estimation for Frequency-Selective and Frequency-Flat Fast-Fading Channels," IEEE Transactions On communications, vol. 49, No. 12, pp. 2106-2114, Dec. 2001.

Lizhong Zheng et al., "Communication on the Grassmann Manifold: A Geometric Approach to the Noncoherent Multiple-Antenna Channel," IEEE Transactions On Information Theory, vol. 48, No. 2, pp. 359-383, Feb. 2002.

Min Dong et al., "Optimal Design and Placement of Pilot Symbols for Channel Estimation," IEEE Transactions On Signal Processing, vol. 50, No. 12, pp. 3055-3069, Dec. 2002.

Massimiliano (Max) Martone, "Wavelet-Based Separating Kernals for Sequence Estimation with Unknown Rapidly Time-Verifying Channels," IEEE Communications Letter, vol. 3, No. 3, pp. 78-80, Mar. 1999.

Muriel Medard, "The Effect Upon Channel Capacity in Wireless Communications of Perfect and Imperfect Knowledge of the Channel," IEEE Transactions on Information Theory, vol. 46, No. 3, pp. 933-946, May 2000.

Michele Morelli et al., "Carrier-Frequency Estimation for Transmisions Over Selective Channels," IEEE Transactions On Communications, vol. 48, No. 9, pp. 1580-1589, Sep. 2000.

Magnus Sandell et al., "A Comparative Study of Pilot-Based Channel Estimators for Wireless OFDM," pp. 5-34, Sep. 1996.

Martin V. Clark, "Adaptive Frequency-Domain Equalization and Diversity Combining for Broadband Wireless Communications," IEEE Journal on Selected Areas in Communications, vol. 16, No. 8, pp. 1385-1395, Oct. 1998.

Michail K. Tsatsanis et al., "Equalization of Rapidly Fading Channels: Self-Recovering Methods," IEEE Transactions on Communications, vol. 44, No. 5, pp. 619-630, May 1996.

Michail K. Tsatsanis et al., "Modelling and Equalization of Rapidly Fading Channels," International Journal of Adaptive Control and Signal Processing, vol. 10, pp. 159-176, May 1996.

Michail K. Tsatsanis et al., "Pilot Symbol Assisted Modulation in Frequency Selective Fading Wireless Channels," IEEE Transactions On Signal Processing, vol. 48, No. 8, pp. 2353-2365, Aug. 2000.

Naofal Al-Dhahir, "Single-Carrier Frequency-Domain Equalization for Space-Time Blocked-Coded Transmissions Over Frequency-Selective Fading Channels," IEEE Communications Letters, vol. 5, No. 7, pp. 304-306, Jul. 2001.

Oussama Damen et al., "Lattice Code Decoder for Space-Time Codes," IEEE Communication Letters, vol. 4, No. 5, pp. 161-163, May 2000.

Naofal Al-Dhahir et al., "Block Transmission Over Dispersive Channels: Transmit Filter Optimization and Realization, and MMSE-DFE Receiver Performance," IEEE Transactions Information Theory, vol. 42, No. 1, pp. 137-160, Jan. 1996.

Peter Hoeher et al., "Channel Estimation with Superimposed Pilot Sequence," in Procedure GLOBECOM Conference, Brazil, pp. 1-5, Dec. 1999.

Peter Hoeher et al., "Two-Dimensional Pilot-Symbol-Aided Channel Estimation by Wiener Filtering," Procedures of International Conference on Acoustics, Speech and Signal Processing, Munich, Germany, vol. 3, pp. 1845-1848, Apr. 1997.

Paul H. Moose, "A Technique for Orthogonal Frequency Division Multiplexing Frequency Offset Correction," IEEE Transactions On Communications, vol. 42, No. 10, pp. 2908-1314, Oct. 1994.

Peter Schramm, "Analysis and Optimization of Pilot-Channel-Assisted BPSK for DS-CDMA Systems," IEEE Transactions Communications, vol. 46, No. 9, pp. 1122-1124, Sep. 1998.

Peter Schramm et al., "Pilot Symbol Assisted BPSK on Rayleigh Fading Channels with Diversity: Performance Analysis and Parameter Optimization," IEEE Transactions on Communications, vol. 46, No. 12, pp. 1560-1563, Dec. 1998.

Qinfang Sun et al., "Estimation of Continuous Flat Fading MIMO Channel," IEEE Transactions On Wireless Communications, vol. 1, No. 4, pp. 549-553, Oct. 2002.

Rohit Negi et al., "Pilot Tone Selection for Channel Estimation in a Mobile OFDM System," IEEE Transactions On Consumer Electronics, vol. 44, No. 3, pp. 1122-1128, Aug. 1998.

Robert Molten Gray, "On the Asymptotic Eigenvalue Distribution of Toeplitz Matrices," IEEE Transactions On Information Theory, vol. IT-18, No. 6, pp. 725-730, Nov. 1972.

Srihari Adireddy et al, "Optimal Placement of Training for Frequency-Selective Block-Fading Channels," IEEE Transactions On Information Theory, vol. 48, No. 8, pp. 2338-2353, Aug. 2002.

Srihari Adireddy et al., "Detection With Embedded Known Symbols: Optimal Symbol Placement and Equalization," In Procedures of International Conference ASSP, vol. 5, Istanbul, Turkey, pp. 2541-2544, Jun. 2000.

Stephen Baro et al., "Improved Codes for Space-Time Trellis Coded Modulation," IEEE Communication Letters, vol. 4, pp. 1-3, Jan. 2000.

Sergio Benedetto et al., "Principles of Digital Transmission with Wireless Applications," Kluwer Academic/Plenum Publishers, 1 pg., 1999.

Srikrishna Bhashyam et al., "Time-Selective Signaling and Reception for Communication Over Multipath Fading Channels," IEEE Transactions On Communications, vol. 48, No. 1, pp. 1-34, Jan. 2000.

Stefan A. Fechtel et al., "Optimal Parametric Feedforward Estimation of Frequency-Selective Fading Radio Channels," IEEE Transactions on Communications, vol. 42, No. 2/3/4, pp. 1639-1650, Feb./Mar./Apr. 1994.

S.N. Diggavi et al., "Differential Space-Time Coding for Frequency-Selective Channels," Procedures of 36th Conference on Information Sciences and Systems, pp. 1-8, Princeton University, NJ, Mar. 20-22, 2002.

Shuichi Ohno et al., "Average-Rate Optimal PSAM Transmissions Over Time-Selective Fading Channels," IEEE Transactions On Wireless Communications, pp. 374-378, Oct. 2002.

Shuichi Ohno et al., "Capacity Maximizing MMSE-Optimal Pilots for Wireless OFDM Over Frequency-Selective Block Rayleigh-Fading Channels," IEEE Transactions in Information Theory, pp. 2138-2145, vol. 50, No. 9, Sep. 2004.

Shuichi Ohno et al., "Optimal Training and Redundant Precoding For Block Transmissions With Application to Wireless OFDM," IEEE Transactions on Communications, vol. 50, No. 12, pp. 2113-2123, Dec. 2002.

Shengli Zhou et al., "Space-Time Coding With Maximum Diversity Gains Over Frequency-Selective Fading Channels," IEEE Signal Processing Letters, vol. 8, No. 10, pp. 269-272, Oct. 2001.

Shengli Zhou et al., "Subspace-Based (Semi-) Blind Channel Estimation for Block Precoded Space-Time OFDM," IEEE Transactions On Signal Processing, vol. 50, No. 5, pp. 1215-1228, May 2002.

Siavash M. Alamouti, "A Simple Transmit Diversity Technique For Wireless Communications," IEEE Journal on Select Areas In Communications, vol. 16, No. 8, pp. 1451-1458, Oct. 1998.

Thomas Kailath, "Measurements on Time-Variant Communication Channels," IEEE Transactions On Information Theory, vol. IT-8, pp. S229-S236, Sep. 1962.

Thomas Keller et al., "Adaptive Multicarrier Modulation: A Convenient Framework for Time-Frequency Processing in Wireless Communications," IEEE Proceedings of the IEEE, vol. 88, No. 5, pp. 611-640, May 2000.

Thomas L. Marzetta and Bertrand M. Hochwald, "Capacity of a Mobile Multiple-Antenna Communication Link in Rayleigh Flat Fading," IEEE Transactions on Information Theory, vol. 45, pp. 1-38, Jan. 1999.

Tai-Lai Tung et al., "Channel Estimation and Adaptive Power Allocation for Performance and Capacity Improvement of Multiple-Antenna OFDM Systems," Third IEEE Signal Processing Workshop on Signal Processing Advances in Wireless Communications, Taoyuan, Taiwan, pp. 82-85, Mar. 20-23, 2001.

Thomas P. Holden et al., "A Spread-Spectrum Based Synchronization Technique for Digital Broadcast Systems," IEEE Transactions on Broadcasting, vol. 36, No. 3, pp. 185-194, Sep. 1990.

Ufuk Tureli et al., "OFDM Blind Carrier Offset Estimation: ESPRIT," IEEE Transactions On Communications, vol. 48, No. 9, pp. 1459-1461, Sep. 2000.

Vahid Tarokh et al., "Space-Time Block Codes from Orthogonal Designs," IEEE Transactions on Information Theory, vol. 45, No. 5, pp. 1456-1497, Jul. 1999.

Vahid Tarokh et al., "Space-Time Codes for High Data Rate Wireless Communication: Performance Criterion and Code Construction," IEEE Transactions on Information Theory, vol. 44, No. 2, pp. 744-765, Mar. 1998.

Werner Kozek, "On the Transfer Function Calculus for Underspread LTV Channels," IEEE Transactions On Signal Processing, vol. 45, No. 1, pp. 219-223, Jan. 1997.

Wen-Yi Kuo et al., "Frequency Offset Compensation of Pilot Symbol Assisted Modulation in Frequency Flat Fading," IEEE Transactions on Communications, vol. 45, No. 11, pp. 1412-1416, Nov. 1997.

Won-Joon Choi et al., "Multiple Input/Multiple Output (MIMO) Equalization for Space-Time Block Coding," IEEE Pacific Rim Conference on Communications, Computers and Signal Processing, pp. 341-344, 1999.

Won-Joon Choi et al., "Space-Time Block Codes Over Frequency Selective Rayleigh Fading Channels," IEEE VTC, vol. 5, pp. 2541-2545, 1999.

Xavier Giraud et al., "Algebraic Tools To Build Modulation Schemes for Fading Channels," IEEE Transactions on Information Theory, vol. 43, No. 3, pp. 938-952, May 1997.

Xiaodong Wang et al., "Interative (Turbo) Soft Interference Cancellation and Decoding for Coded CDMA," IEEE Transactions on Communications, vol. 47, No. 7, pp. 1046-1061, Jul. 1999.

Xiaoli Ma et al., "Maximum Diversity Transmissions Over Doubly Selective Wireless Channels," IEEE Transactions On Information Theory, vol. 49, No. 7, pp. 1832-1840, Jul. 2003.

Xiaoli Ma et al., "Optimal Training for Block Transmissions Over Doubly Selective Wireless-Fading Channels," IEEE Transactions on Signal Processing, vol. 51, No. 5, pp. 1351-1366, May 2003.

Xiaoli Ma et al., "Non-Data-Aided Carrier Offset Estimatiors for OFDM With Null Subcarriers: Identifiability, Algorithms, and Performance," IEEE Journal On Selected Areas In Communications, vol. 19, No. 12, pp. 2504-2515, Dec. 2001.

Xiaoli Ma et al., "Optimal Training for MIMO Frequency-Selective Fading Channels," IEEE Transactions on Wireless Communications, pp. 1-14.

Ye (Geoffrey) Li et al., "Transmitter Diversity for OFDM Systems and Its Impact on High-Rate Data Wireless Networks," IEEE Journal on Selected Areas In Communications, vol. 17, No. 7, pp. 1233-1243, Jul. 1999.

Ye (Geoffrey) Li, "Simplified Channel Estimation for OFDM Systems With Multiple Transmit Antennas," IEEE Transactions On Wireless Communications, vol. 1, No. 1, pp. 67-75, Jan. 2002.

Ye (Geoffrey) Li, Nambirajan Seshadri, and Sirikiat Ariyavisitakul, "Channel Estimation for OFDM Systems with Transmitter Diversity in Mobile Wireless Channels," IEEE Journal on Selected Areas in Communications, Vol. 17, No. 3, pp. 461-471, Mar. 1999.

Youjian Liu et al., "Space-Time Codes Performance Criteria and Design for Frequency Selective Fading Channels," Procedures of International Conference on Communication, pp. 1-5.

Yuan-Pei Lin et al., "Block Based DMT Systems Wtih Reduced Redundancy," Procedures of International Conference on ASSP, Salt Lake City, UT, pp. 2357-2360, May 2001.

Yan Xin et al., "Linear Unitary Precoders for Maximum Diversity Gains with Multiple Transmit and Receive Antennas," Procedure of 34th Asilomar Conference on Signals, Systems, and Computers, pp. 1553-1557, Pacific Grove, CA, Oct. 29-Nov. 1, 2000.

Yuze Zhang et al., "A Performance Analysis and Design of Equalization with Pilot Aided Channel Estimation," Procedures of the 47th Vehicular Technology Conference, vol. 2, pp. 720-724, 1997.

Yuze Zhang et al., "Soft Output Demodulation on Frequency-Selective Rayleigh Fading Channels Using AR Channel Models," Procedures of Global Communications Conference, vol. 1, pp. 327-331, 1997.

Zhiqiang Liu et al., "Space-Time Block-Coded Multiple Access Through Frequency-Selective Fading Channels," IEEE Transactions on Communications, vol. 49, No. 6, pp. 1033-1044, June 2001.

Zhiqiang Liu et al., "Space-Time Coding for Broadband Wireless Communications," Wireless Communication Mobile Computers, vol. 1, No. 1, pp. 33-53, Jan.-Mar., 2001.

Zhiqiang Liu et al., "Transmit-Antennae Space-Time Block Coding for Generalized OFDM in the Presence of Unknown Multipath," IEEE Journal on Selected Areas In Communications, vol. 19, No. 7, pp. 1352-1364, Jul. 2001.

Zhiqiang Liu et al., "Linear Constellation Precoding for OFDM with Maximum Multipath Diversity and Coding Gains," IEEE Transaction On Communications, vol. 51, No. 3, pp. 416-427, Mar. 2003.

Zhiqiang Liu et al., Space-Time-Frequency Coded OFDM Over Frequency-Selective Fading Channels, IEEE Transactions on Signal Processing, vol. 50, No. 10, pp. 2465-2476, Oct. 2002.

Zhiqiang Liu et al., "Space-Time Coding With Transmit Antennas for Multiple Access Regardless of Frequency-Selective Multipath," Procedures of Sensor Arry and Multichannel Signal Processing Workshop, pp. 178-182, Mar. 2000.

Zhengdao Wang et al., "Linearly Precoded or Coded OFDM Against Wireless Channel Fades?," Third IEEE Signal Processing Workshop on Signal Processing Advances in Wireless Communications, Taoyuan, Taiwan, pp. 1-4, Mar. 20-23, 2001.

Zhengdao Wang et al., "Optimality of Single-Carrier Zero-Padded Block Transmissions," Procedures of Wireless Communications and Networking Conferences, vol. 2, pp. 660-664, 2002.

* cited by examiner

CHANNEL ESTIMATION FOR WIRELESS OFDM SYSTEMS

This application claims priority from U.S. Provisional Application Ser. No. 60/274,367, filed Mar. 8, 2001, the contents being incorporated herein by reference.

This invention was made with government support under ECS-9979443 awarded by the National Science Foundation. The government has certain rights in the invention.

TECHNICAL FIELD

The invention relates to communication systems and, more particularly, channel estimation for Orthogonal Frequency Division Multiplexing (OFDM) transmissions over wireless propagation media.

BACKGROUND

In multi-carrier wireless communication systems, such as mobile phone networks, wireless local area networks and satellite communications, transmitters and receivers communicate through wireless propagation "channels." The transmitted waveforms are reflected by scatterers present in the wireless media, and arrive at the receiver via many different paths. The multi-path wireless channel causes interference between the transmitted data symbols, referred to as inter-symbol interference (ISI).

In order to recover the transmitted sequence, the receiver estimates and compensates for the channel effects induced by the wireless communication channel. The channel is characterized either in the time-domain via its impulse response (the channel output when the input is an impulse), or in the frequency domain via its frequency response (the channel output when the input is a complex exponential with certain frequency). Techniques for estimating the channel's impulse or frequency response are generally referred to as data-aided, blind, or, semi-blind. In data-aided techniques, the transmitter sends a training sequence that is known by the receiver. The receiver can then estimate the impulse response of the channel by comparing the received data, i.e., the output of the channel, with the training sequence. In blind and semi-blind techniques, the receiver applies advanced signal processing algorithms to estimate the channel effects without exact knowledge of the transmitted data.

SUMMARY

In general, the described invention provides an efficient technique for estimating and compensating for effects of a communication channel in multi-carrier wireless communication systems, such as systems using the Orthogonal Frequency Division Multiplexing (OFDM) modulation format. As illustrated below, the technique can be used in both blind and semi-blind modes of channel estimation. The channel estimation techniques exploit the fact that the transmitted symbols are generated from a finite alphabet in order to efficiently and effectively estimate the impulse response of the underlying channel.

In one embodiment, the invention is directed to a system in which a transmitter transmits data through a wireless communication channel according to the OFDM modulation format. A receiver includes an OFDM demodulator to recover the data received from the communication channel, and a channel estimator to identify the channel based on the demodulated data. Sampled at symbol rate, the discrete-time channel is described by L+1 equal-spaced coefficients (taps), and termed as an $L^{th}$ order channel. The channel estimator uses the $J^{th}$ power of the demodulated data to identify the channel impulse response. The parameter J is selected based on the constellation format used for the transmitted symbols. With proper system design parameters, including each transmitted block size M, the channel order L, and the signal constellation, channel identifiability can be guaranteed from a single demodulated data block, when $M>JL$.

In another embodiment, the invention is directed to a method in which data is received from a transmitter through a wireless communication channel. Demodulated data is generated from the received data. A response is estimated for the channel based on the demodulated data. Even when $M<JL$, a semi-blind implementation of the proposed method, exploiting the existing training symbols at the beginning of data transmission for synchronization and coarse channel estimation purposes, also yields accurate channel estimates.

The channel estimation techniques described herein offer many advantages. For example, channel identifiability can be achieved even when the channel has nulls on sub-carriers. For channels having a high signal-to-noise ratio, estimation can be achieved even from a single OFDM symbol, allowing the receiver to track fast channel variations. In addition, the channel estimation techniques are robust to fading propagation, permit reduced complexity digital implementation, and accommodate frequency guards.

DETAILED DESCRIPTION

Figure 1:
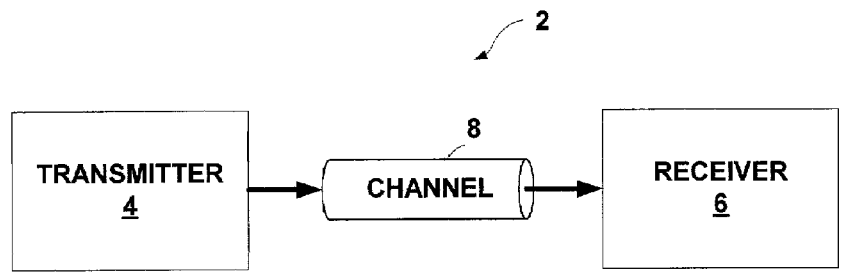
FIG. 1 is a block diagram illustrating a wireless system in which a transmitter communicates data to a receiver through a channel.

FIG. 1 is a block diagram illustrating a telecommunication system 2 in which transmitter 4 communicates data to receiver 6 through wireless channel 8. In general, the invention provides an efficient technique for estimating and compensating for effects of channel 8. Transmitter 4 transmits data to receiver 6 using the modulation format of Orthogonal Frequency Division Multiplexing (OFDM), which has been adopted by many standards including digital audio and video broadcasting (DAB, DVB) in Europe and high-speed digital subscriber lines (DSL) in the United States. OFDM has also been proposed for local area mobile wireless broadband standards including IEEE 802.11a, MMAC and HIPERLAN/2. The channel estimation techniques described herein can be used with other modulation formats for multi-carrier systems including Orthogonal Frequency Division Multiple Access (OFDMA) and multi-carrier CDMA. In addition to standard OFDM transmission formats that may use a Cyclic Prefix, the techniques are applicable to other formats such as the recently proposed zero padded OFDM transmission format.

Receiver 6 may be any device configured to receive a multi-carrier wireless transmission including a cellular phone, a laptop or handheld computing device, a personal digital assistant (PDA), a Bluetooth™ enabled device and the like. Transmitter 4 may be any device for generating a wireless transmission such as a cellular distribution station, a satellite or a hub for a wireless local area network.

Figure 2:
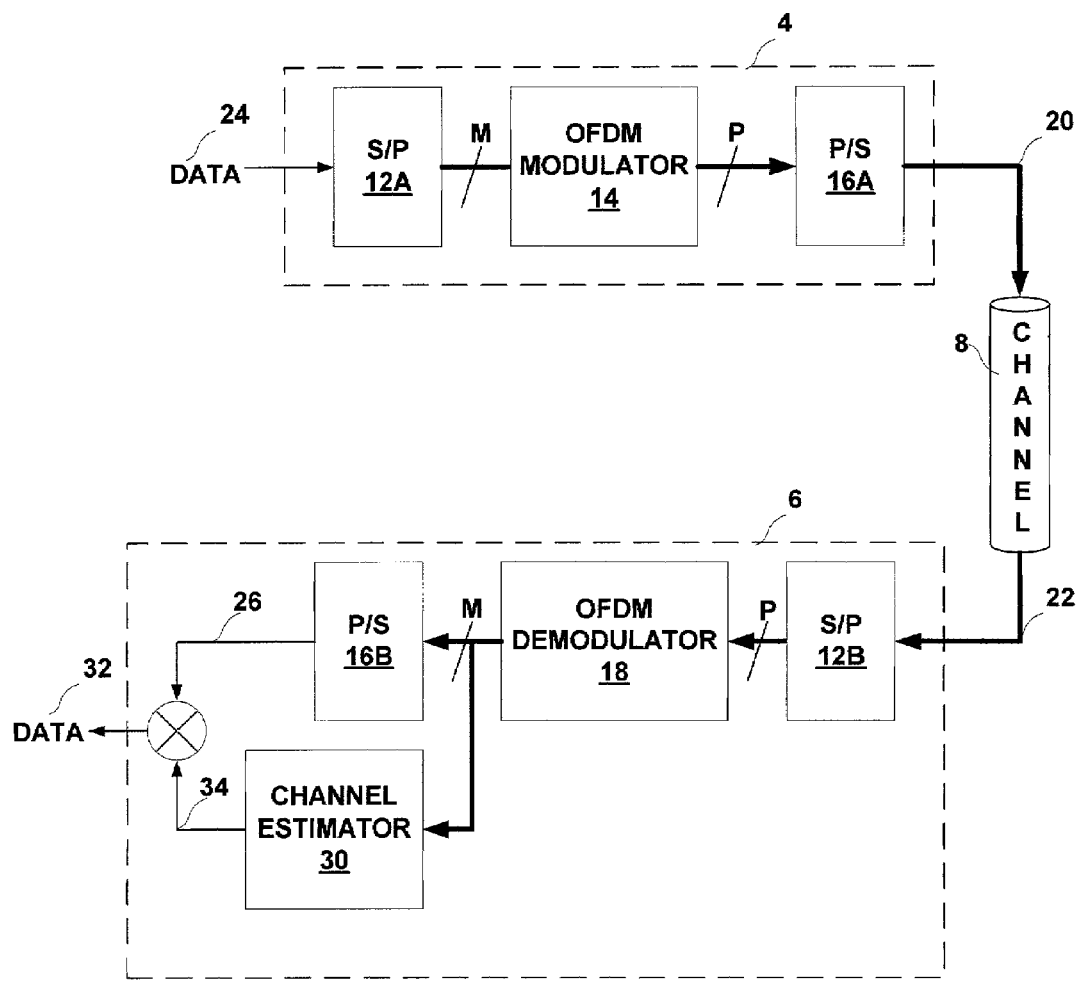
FIG. 2 illustrates in further detail the process of communicating data from the transmitter to the receiver using OFDM modulation.

FIG. 2 illustrates in further detail the process of communicating data from transmitter 4 to receiver 6 using OFDM. Serial to parallel (S/P) converter 12A of transmitter 4 converts the outbound data 24 from a serial data stream to blocks of M symbols, each symbol representing a discrete information bearing value selected from a finite set ("alphabet"). For example, a simple alphabet (constellation) used by transmitter 4 may be ±1, or −3, −1, +1, +3. OFDM modulator 14 modulates data by applying an inverse Fast Fourier Transform (IFFT) of length M. The OFDM modulator 14 inserts also redundancy in the form of a Cyclic Prefix of length L to prevent Inter Symbol Interference (ISI), thereby producing blocks of P=M+L symbols. Parallel to serial (P/S) converter 16A converts the modulated data into a transmission waveform 20 for carrying the transmitted data through channel 8.

Receiver 6 receives waveform 22, which typically is a function of the transmission waveform 20 and the channel 8. S/P converter 12B samples waveform 22, buffers the discrete data and groups the data into blocks of size P. Demodulator 18 discards the Cyclic Prefix of the incoming blocks, thereby producing blocks of M symbols. Demodulator 18 then applies a Fast Fourier Transform of length M to demodulate data. P/S converter 16B converts the blocks back into a serial data 26.

Channel estimator 30 receives post-FFT data, i.e., the demodulated data, from demodulator 18 and, as described in detail below, estimates the impulse response for channel 8. Channel estimator 30 provides an output signal 34 that can be combined with data stream 26 to remove the effects of channel 8, thereby producing data 32 representative of the transmitted data. In other words, channel estimator 30 enables receiver 6 to compensate for channel fading effects that could otherwise cause data loss.

Figure 3:
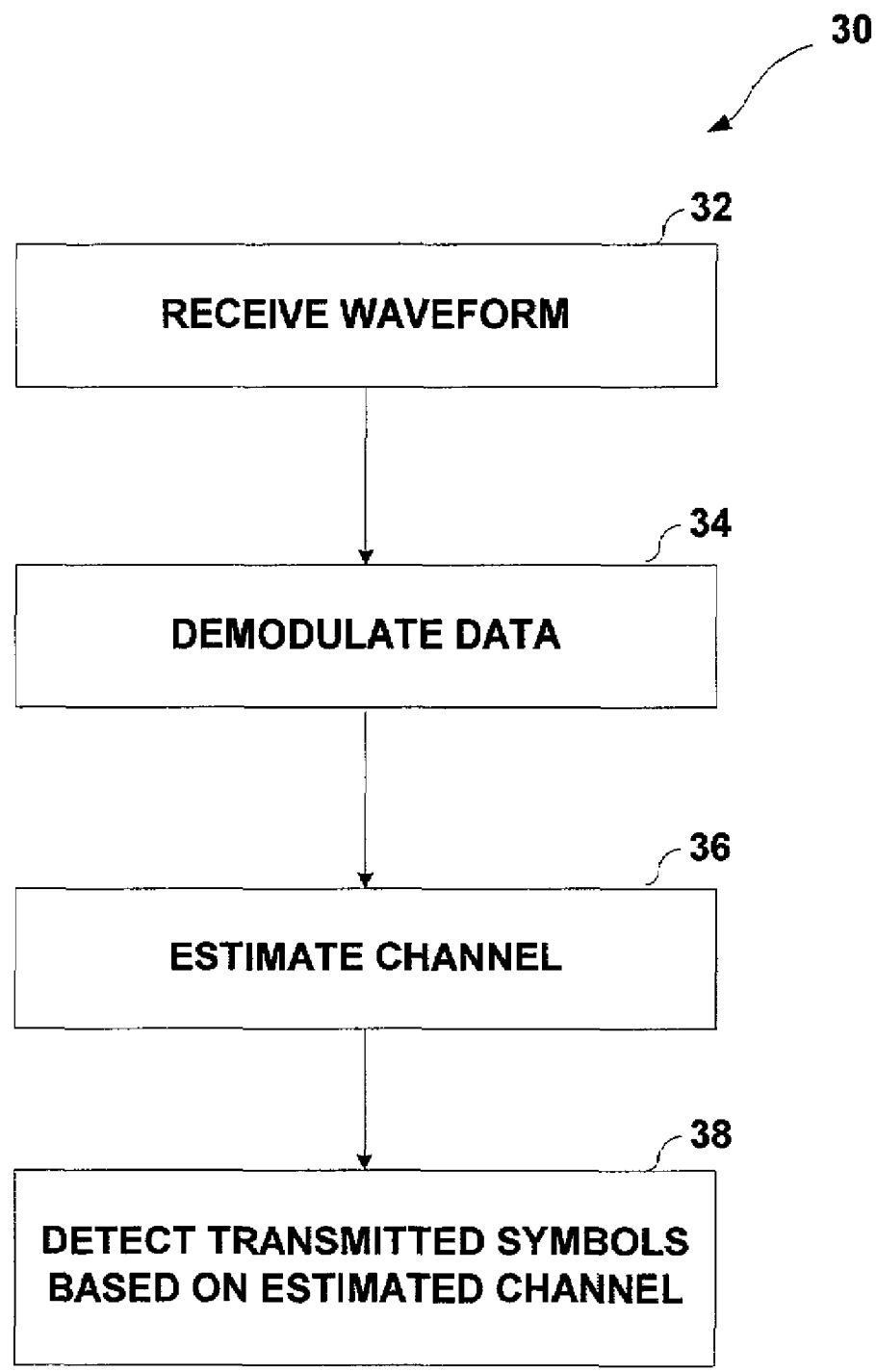
FIG. 3 is a flowchart illustrating the operation of the receiver to estimate the channel and to detect the symbols.

FIG. 3 is a flowchart illustrating the operation of receiver 6. First, receiver 6 receives waveform 22 from channel 8 (32). Receiver 6 samples the incoming waveform 22, generates blocks of discrete data from waveform 22 and demodulates the data, typically by discarding the CP and applying an FFT operation (34). Channel estimator 30 processes the demodulated data in order to estimate the channel response (36). In order to estimate the channel response for multi-carrier (OFDM) communication systems, channel estimator 30 exploits the fact that the transmitted symbols are selected from a finite alphabet, as described below. Receiver 6 uses the channel estimates to compensate for the channel effect and detect transmitted symbols within the received waveform (38).

Figure 4:
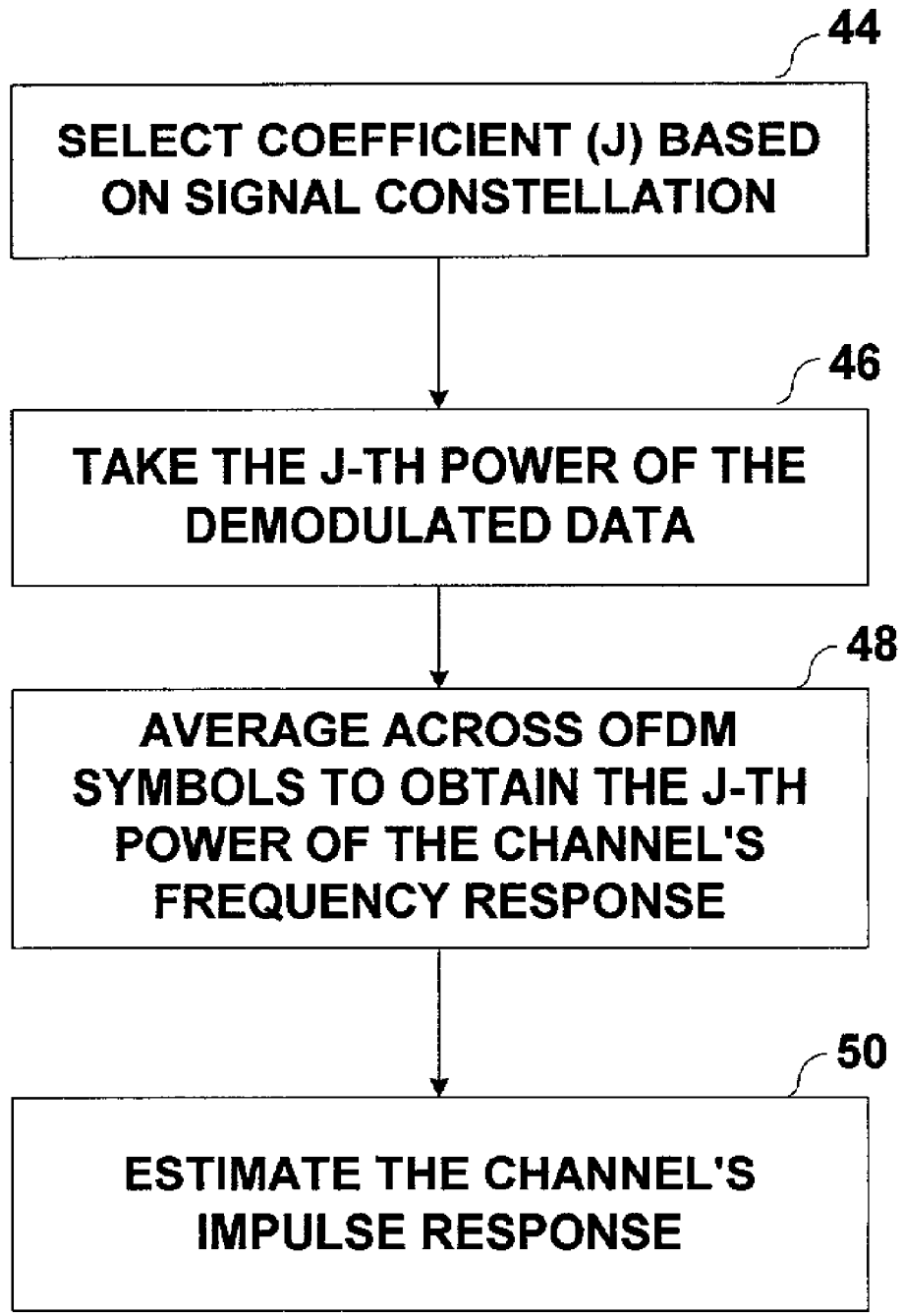
FIG. 4 is a flowchart illustrating the channel estimation process.

FIG. 4 is a flowchart illustrating in detail the processing of demodulated data to estimate the response of channel 8. Generally, channel estimator 30 takes the $J^{th}$ power of the demodulated data in order to generate data representative of the channel's frequency response. The parameter J is determined by the signal constellation used by the transmitter 4 (44). Because the symbols are drawn from a finite alphabet set of size Q, i.e., the $m^{th}$ symbol in the $i^{th}$ block s(i;m) $\in \{\zeta_q\}_{q=1}^Q$, the symbols must satisfy a $Q^{th}$-order polynomial in s(i,m):

$$S^Q(i;m) + \alpha_1 S^{Q-1}(i;m) + \ldots + \alpha_Q = 0,$$

where the coefficients $\alpha_1, \ldots, \alpha_Q$ are determined by the constellation points $\{\zeta_q\}_{q=1}^Q$. The coefficient J is selected as the smallest index of the nonzero coefficients, i.e., $\alpha_J \neq 0$; $\alpha_n = 0$, $\forall n < J$.

For example, for a phase-shift keying (PSK) constellation of size Q: $\{\zeta_q = \exp(j2\pi q)/Q + j\pi/Q)\}_{q=1}^Q$, it follows that J=Q and $\alpha_J = 1$; therefore, J=2 for BPSK and J=4 for quadrature phase shift keying (QPSK) signals. For quadrature amplitude modulation (QAM) with Q constellation points, e.g., Q=16,32,64, 128, 256, it follows that J=4. For 8PSK, we have J=8.

For channels with L+1 taps, the blind channel identifiably of the $L^{th}$-order channel can be achieved within the demodulated data produced by demodulator 18, by selecting the block size M to satisfy M>JL. Typically, J is a small positive integer for common modulation schemes, such as for BPSK modulation where J=2. Thus, as described in detail below, channel identifiability can be achieved from a single demodulated data block of small size, such as 21 symbols for the $10^{th}$ order channel. Specifically, in this case, J=2, L=10, and M>JL=20.

Having found the parameter J, channel estimator 30 next relies on the $J^{th}$ power of the demodulated data (46). Averaging across multiple OFDM symbols to decrease the noise level, Channel estimator 30 obtains estimates of the $J^{th}$ power of the channel's frequency response (48).

For example, data received from channel 8 can generally be expressed as a function of the transmitted data and the channel effects as follows:

$$Data_{rec} = Data_{xmit} * Channel$$

where $Data_{rec}$ is the data received, $Data_{xmit}$ is the data transmitted and Channel represents the frequency response of the channel. If the transmitted symbols were drawn from a finite alphabet comprising +1 and −1, the channel effects could be isolated within the received data by squaring the received data (J=2), yielding the following equation:

$$Data_{rec}^2 = Channel^2$$

At this point, the square of the channel's frequency response is estimated.

In a more general sense, therefore, the channel response raised to the $J^{th}$ power can be expressed as a function of the received data as follows:

$$\hat{H}^J = (e^{j2\pi m/M}) = \frac{-\alpha_J Q}{J} \left( \frac{1}{I} \sum_{i=0}^{I-1} y^J(i; m) \right),$$

where $\hat{H}(e^{j2\pi m/M})$ represents the channel response at the frequency $e^{j2\pi m/M}$, y(i; m) represents the $m^{th}$ demodulated symbol in the $i^{th}$ block, and the averaging is performed across I consecutive received OFDM symbols. Channel estimator 30 applies the above non-linear power operation to the received data in order to isolate the channel's frequency response from the transmitted data.

After applying the $J^{th}$ power operation, channel estimator 30 needs to estimate the channel's impulse response from estimates of the $J^{th}$ power of the channel's frequency response (50). Various channel estimation algorithms become available by trading off complexity with performance. More specifically, after processing the received data to yield $\hat{H}^J$, channel estimator 30 can estimate the channel's impulse response ĥ by using one of a number of techniques.

Example methods include root selection (RS) methods, linear equation based methods, minimum distance (MD) methods, modified MD methods, and iterative refinement schemes.

One advantageous technique for solving for the channel's impulse response is a phase directed (PD) iterative refinement method. With initial channel estimate, the PD method improves the channel estimation accuracy considerably, and enables channel tracking for slowly time-varying wireless channels. The PD method has the advantage that it does not propagate error, as do conventional data-directed iterative techniques for channel estimation. Furthermore, the PD method decouples channel estimation from symbol estimation unlike conventional decision-directed algorithms, which rely on initial channel estimates and then alternate between channel and symbol estimation until convergence. The PD method provides fast and accurate channel estimation in environments in which the channel has a low signal-to-noise ratio (SNR).

Figure 5:
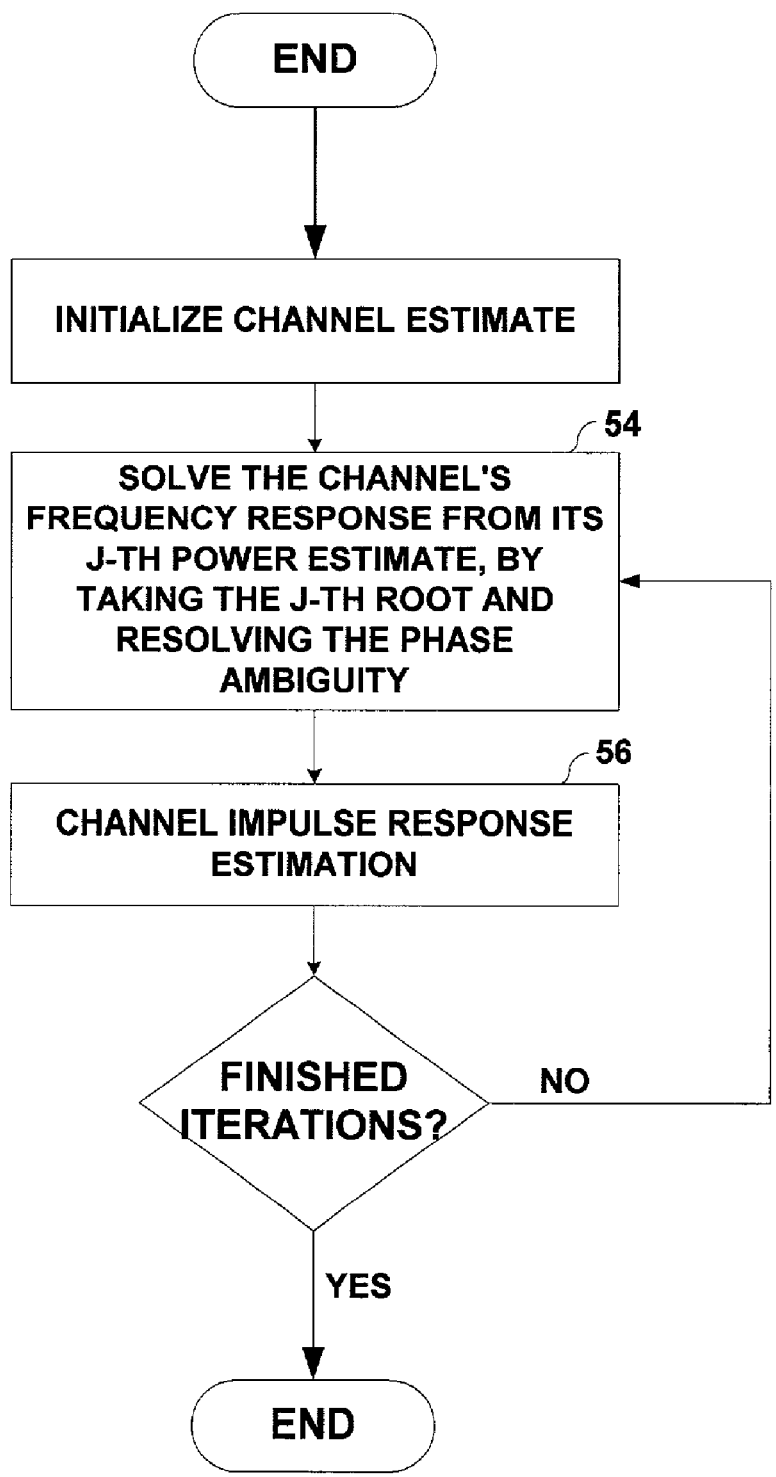
FIG. 5 is a flowchart illustrating an example algorithm of channel estimation.

As depicted in FIG. 5, the PD method iterates between resolving phase ambiguities (54) and updating the channel estimates (56). For each m, the channel's frequency response $\hat{H}$ is estimated according to $\hat{H}(\rho_m) = \lambda_m [\hat{H}^J \rho_m)]^{1/J}$ up to a scalar ambiguity $\lambda_m \in \{\rho_m = e^{j2\pi n/J}\}_{n=0}^{J-1}$. For each m $\in [0, M-1]$, the phase ambiguity is resolved by searching over the J candidate phase values:

$$\lambda_m = arg\ min\ |\lambda_m \hat{H}_0(\rho_m) - \lambda_m [\hat{H}_J(\rho_m)]^{1/J}|^2,$$

where $\hat{H}_0(\rho_m)$ is the initial channel estimate obtained by low complexity methods, such as RS. To improve the channel estimation accuracy, channel estimator 30 applies phase directed iterations. Starting from $i_1 = 0$, the channel estimator 30 sets $i_1 := i_1 + 1$ at each successive iteration, and resolves phase ambiguities by replacing $\hat{H}_0(\rho_m)$ with $\hat{H}_{i_1-1}(\rho_m)$ and then forming the following vector:

$$\tilde{h}_1 := [\hat{\lambda}_0 [\hat{H}^J(\rho_0)]^{1/J}, \ldots, \hat{\lambda}_{M-1} [\hat{H}^J(\rho_{M-1})]^{1/J}]^T.$$

Channel estimator 30 then updates the estimates of the channel's impulse response as $\hat{h}_{i1} = V_1^+ \tilde{h}_1 = (1/M) V_1^H \tilde{h}_1$, where $V_1$ is a matrix proportional to the first L+1 columns of the FFT matrix and links the channel's frequency response with the channel's impulse response. The channel's frequency response is also updated via $\hat{H}_{i1} = V_1 \hat{h}_{i1}$, that is to be used in the next iteration. Channel estimator 30 repeats the process a fixed number of times, such as $I_1$, or until $\hat{h}_{i1} \approx \hat{h}_{i_j-1}$ in the Euclidean norm sense. With only two or three iterations, the PD technique achieves as good performance as the highly-complex MD method.

Figure 6:
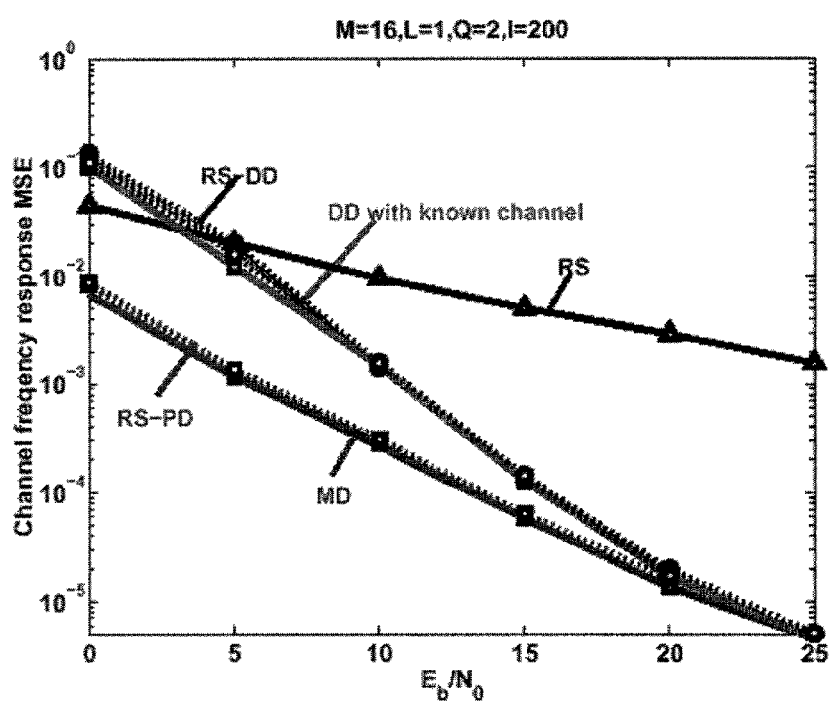
FIGS. 6, 7 and 8 are graphs illustrating the performance of exemplary estimation techniques.

FIG. 6 is a graph illustrating the results of the estimation techniques described above including the PD method, a data-directed method (DD), root selection (RS) method and a minimum distance (MD) method. The MD method is useful as a baseline target because it is very accurate, but is very complex and requires significant time and resources. FIG. 5 illustrates the results from a modeled communication system using a BPSK modulation format, a block size (M) of 16 symbols, a channel order (L) of 1 and a coefficient (J) of 2. As described above, the channel estimate for the PD and DD methods are initialized by the RS method. Notably, regardless of the SNR, the mean square error (MSE) for the PD method tracks the MSE of the MD method.

Figure 7:
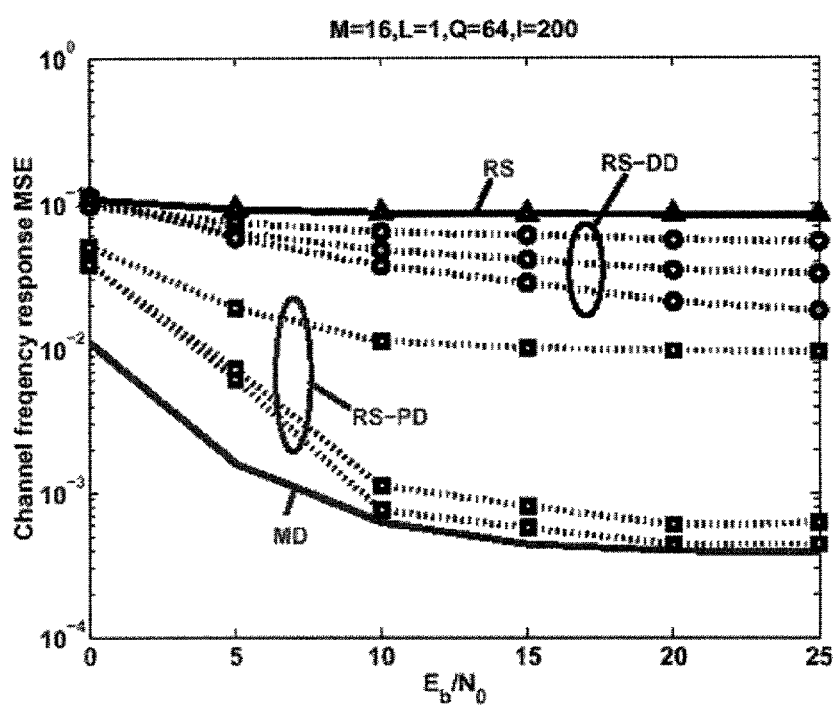

FIG. 7 is a graph illustrating the MSE of the various estimation methods for the same setup as FIG. 6, except using 64 QAM modulation. For all SNR's, the MSE for the PD method is better than a data-aided method. For a SNR greater than 10 decibel, the MSE for the PD method approaches the MD method.

Figure 8:
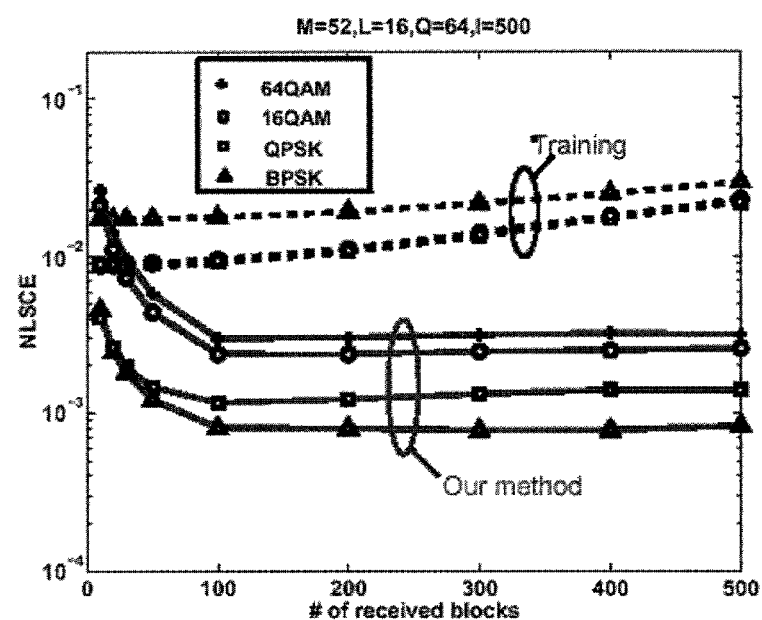

FIG. 8 is a graph illustrating the MSE of the various estimation methods in a mobile LAN environment operating according to the HIPERLAN/2 standard. Here, the PD algorithm is initialized by the training method. The PD algorithm outperforms the training method, and is capable of tracking variations for slowly time-varying channels.

Various embodiments of the invention have been described. The channel estimation techniques exploit the finite alphabet property of information bearing symbols. Unlike other techniques, channel identifiability can be achieved even when the channel has nulls on sub-carriers. For channels having a high signal-to-noise ratio, estimation can be achieved even from a single OFDM symbol, allowing the receiver to track even fast channel variations.

The inventive techniques for channel estimation can be embodied in a variety of systems including cell phones, laptop computers, handheld computing devices, personal digital assistants (PDA's), and the like. The devices may include a digital signal processor (DSP), field programmable gate array (FPGA), application specific integrated circuit (ASIC) or similar hardware or software to estimate the channel response as described above. These and other embodiments are within the scope of the following claims.

The invention claimed is:

1. A method comprising:
   receiving data from a transmitter that transmits information symbols through a communication channel;
   generating orthogonal frequency division modulation (OFDM) demodulated data from the received data; and
   estimating an impulse response of the channel based on the demodulated data by selecting a coefficient (J) based on a signal constellation of the transmitted information symbols and applying a power operation to the demodulated data.

2. The method of claim 1, further comprising detecting the transmitted symbols within the received data based on the estimated impulse response.

3. The method of claim 1, wherein estimating the impulse response comprises applying a $J^{th}$ order power operation to the demodulated data.

4. The method of claim 1, wherein estimating the channel comprises:
   applying a $J^{th}$ power operation to the demodulated data; and
   estimating the $J^{th}$ power of the channel's frequency response.

5. The method of claim 1, wherein estimating the channel comprises computing the channel's impulse response from the $J^{th}$ power of the channel's frequency response.

6. The method of claim 5, wherein computing the channel's impulse response comprises computing the impulse response according to a root selection method, a linear equation based method, a minimum distance (MD) method, a modified MD method, or, iterative refinement schemes.

7. The method of claim 5, wherein computing the channel's impulse response comprises a phase-directed method.

8. The method of claim 7, wherein computing the channel's impulse response according to the phase-directed method comprises:
   resolving phase ambiguities from the $J^{th}$ power of the channel's frequency response; and
   updating the channel's impulse and frequency response estimates based on the resolved phase ambiguities.

9. A method comprising:
  receiving data from a transmitter that transmits information symbols through a communication channel;
  generating channel response data having OFDM symbols by selecting a coefficient (J) based on a signal constellation of the transmitted information symbols and applying a $J^{th}$ power operation to the received data;
  estimating the channel's impulse response based on the channel response data; and
  detecting the transmitted symbols within the received data based on the estimated response.

10. The method of claim 9, wherein applying the power operation data further comprises taking the $J^{th}$ power of the received data and averaging across multiple OFDM symbols to obtain the $J^{th}$ power of the channel's frequency response.

11. The method of claim 9, wherein estimating the impulse response comprises computing the impulse response according to a root selection method, a linear equation based method, a minimum distance (MD) method, a modified MD method, and an iterative refinement scheme.

12. The method of claim 9, wherein computing the channel's impulse response comprises computing the impulse response according to a phase-directed method.

13. A computer-readable medium having instructions thereon to cause a programmable processor to:
  receive data from a transmitter that transmits information symbols through a communication channel;
  generate demodulated data from the received data;
  select a coefficient J based on a signal constellation of the transmitted information symbols;
  apply a power operation to the received data; and
  estimate a response for the channel based on the received data.

14. The computer-readable medium of claim 13 further including instructions to cause the processor to detect the transmitted symbols within the received data based on the estimated response.

15. The computer-readable medium of claim 13 further including instructions to cause the processor to apply a $J^{th}$ power operation to the received data.

16. The computer-readable medium of claim 15 further including instructions to cause the processor to solve for the channel's impulse response from the $J^{th}$ power of the channel's frequency response.

17. A receiving device comprising:
  a demodulator to demodulate data received from a transmitter tat transmits information symbols through a communication channel; and
  a channel estimator that selects a coefficient (J) based on a signal constellation of the transmitted information symbols and applies a power operation to the demodulated data to estimate a response for the channel based on the demodulated data.

18. The receiving device of claim 17, wherein the channel estimator comprises a digital signal processor (DSP).

19. The receiving device of claim 17, wherein the receiving device comprises a cellular phone.

20. The receiving device of claim 17, further comprising a detector coupled to the demodulator and the channel estimator to detect transmitted information symbols within the received data based on the estimated response and the received data.

21. The receiving device of claim 20, wherein the channel estimator applies a non-linear powering operation to the demodulated data.

22. The receiving device of claim 17, wherein the information symbols are modulated according to a multi-carrier modulation format and the demodulator applies a Fast Fourier Transform (FFT) to the received data.

23. The receiving device of claim 17, wherein the demodulator generates blocks of demodulated data having M symbols, wherein M is a positive nonzero integer.

24. The receiving device of claim 17, wherein the channel estimator computes the channel's impulse response from the $J^{th}$ power of the channel's frequency response, according to a root selection method, a linear equation based method, a minimum distance (MD) method, a modified MD method, or an iterative refinement scheme.

25. A system comprising:
  a transmitter to transmit data information symbols through a wireless communication channel according to a modulation format; and
  a receiver comprising a demodulator to demodulate data received from the communication channel, and a channel estimator coupled to the demodulator that selects a coefficient (J) based on a signal constellation of the transmitted information symbols and applies a power operation to the demodulated data to estimate the channel based on the demodulated data.

26. The system of claim 25, wherein the modulation format comprises a multi-carrier (OFDM) format.

27. The system of claim 25, wherein the modulation format is selected from OFDMA or multi-carrier CDMA.

28. The system of claim 25, wherein the demodulator averages over multiple symbols of the demodulated data to obtain the $J^{th}$ power of the channel's frequency response.

29. The system of claim 28, wherein the demodulator estimates the channel's impulse response from $J^{th}$ power of the channel's frequency response.

30. The system of claim 28, wherein the channel estimator computes the channel's impulse response from the $J^{th}$ power of the channel's frequency response, according to one of a root selection method, a linear equation based method, a minimum distance (MD) method, a modified MD method, and an iterative refinement scheme.

* * * * *

UNITED STATES PATENT AND TRADEMARK OFFICE
CERTIFICATE OF CORRECTION

| | | |
|---|---|---|
| PATENT NO. | : 7,139,321 B2 | Page 1 of 1 |
| APPLICATION NO. | : 10/094946 | |
| DATED | : November 21, 2006 | |
| INVENTOR(S) | : Shengll Zhou and Georgios B. Giannakis | |

It is certified that error appears in the above-identified patent and that said Letters Patent is hereby corrected as shown below:

Col. 1, Line 17, please insert the following -- STATEMENT REGARDING FEDERALLY SPONSORED RESEARCH OR DEVELOPMENT This invention was made with Government support under Contract Nos. DAAL01-98-1-0648, Contract No, DAAD19-00-1-0013 and DAAG55-98-1-0336 all awarded by the U.S. Army. The Government may have certain rights in this invention.--

Signed and Sealed this

Twenty-seventh Day of November, 2007

JON W. DUDAS
*Director of the United States Patent and Trademark Office*